Figure 1:
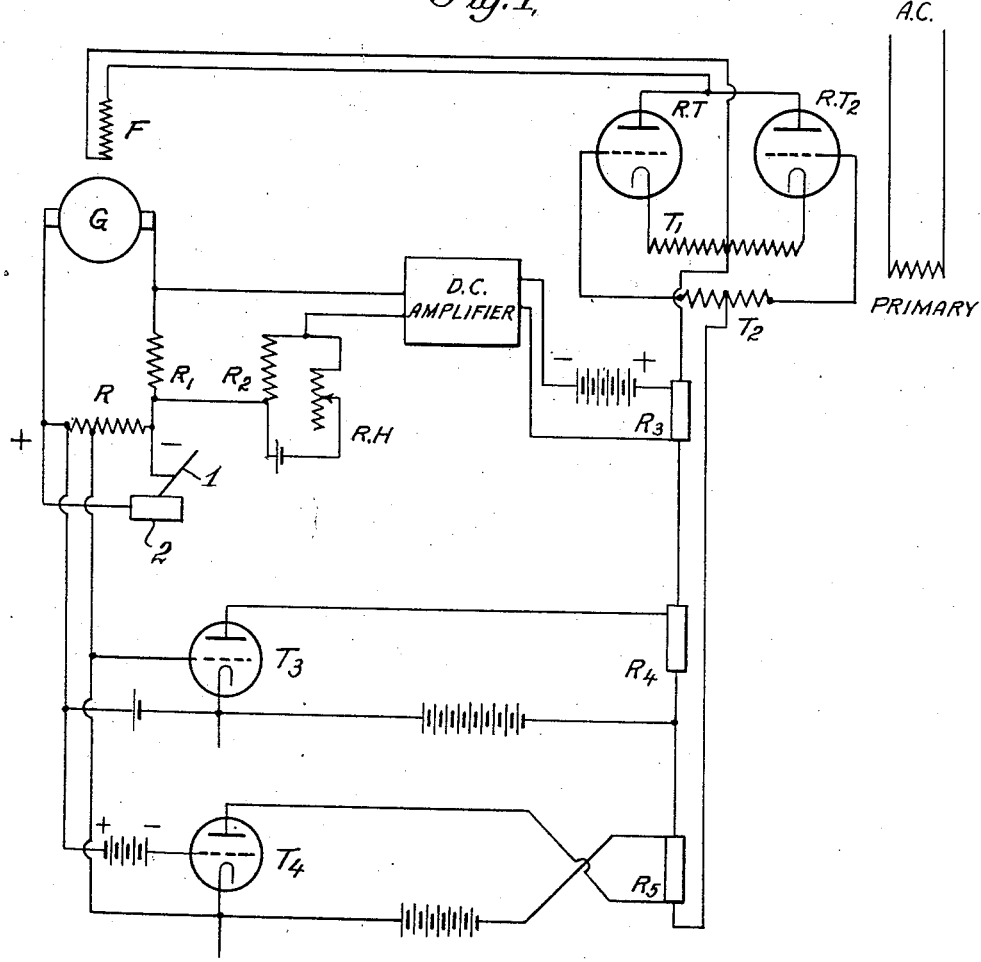

Jan. 11, 1949.    J. M. TYRNER    2,458,658
ELECTRIC ARC WELDING
Filed April 20, 1944

INVENTOR
Joseph M. Tyrner
BY
Pennie Davis Marvin & Edmonds
ATTORNEYS

Patented Jan. 11, 1949

2,458,658

UNITED STATES PATENT OFFICE 2,458,658

ELECTRIC ARC WELDING

Joseph M. Tyrner, New York, N. Y., assignor to Air Reduction Company, Incorporated, New York, N. Y., a corporation of New York Application April 20, 1944, Serial No. 531,854

19 Claims. (Cl. 315—302)

This invention relates to electric arc welding and more particularly to improved methods and apparatus for electric welding whereby the welding operation can be performed with greater efficiency and under operating conditions more stable than those ordinarily experienced.

One of the principal objects of this invention is to provide an electric arc welding system including a welding generator which is automatically controlled to provide a voltage-current characteristic of such a nature that throughout the normal range of welding voltage the welding current is maintained substantially constant. Another object of the invention is to provide such a system in which the welding current is automatically controlled at all voltages above the usual welding range so that as the voltage increases above the normal working range, the welding current decreases, the welding current becoming zero at a safe open circuit voltage. A further object of the invention is to provide a system in which the flow of welding current at voltages below the normal working range is automatically controlled to provide the desired drooping characteristic with a short circuit current limited to a reasonable value.

My invention includes adjustable means for controlling the regulation of the welding current throughout the normal range of welding voltage and this adjustment may be such as to insure control of the generator output whereby the supply of current to the arc may be decreased at the end of a weld to avoid the formation of a crater, while the arc length is maintained substantially constant by the welding operator.

Another feature of my invention relates to what is commonly referred to as the magnetic blow or lateral displacement of the arc, which is ordinarily very objectionable because of the fact that this lateral displacement of the arc is unstable and may even result in the arc being extinguished although the electrode is maintained in its normal position with respect to the work. The magnetic blow or lateral displacement of the arc is caused by the reaction on the arc of the magnetic field surrounding the arc. As the lateral displacement increases, the strength of the arc current decreases, thereby decreasing the magnetic field, and this has the effect of permitting the arc to return to a more direct path between the electrode and the work, whereupon the arc current increases and the cycle is repeated. This oscillating condition produces an instability of the arc which impairs the efficiency of the welding operation.

According to my invention the magnitude of the welding current is maintained substantially constant throughout the normal range of welding voltage, and by thus maintaining the strength of the welding current, the unstable magnetic blow condition above described is eliminated. There is of course a lateral displacement of the welding arc due to the force exerted by the magnetic field created by the welding current, but as long as the current remains constant in value this displacing force remains constant and, accordingly, the oscillations normally experienced because of the fluctuating magnetic field surrounding the ordinary arc, are entirely avoided.

While various means may be employed for maintaining the welding current constant to eliminate the instability of the arc, I prefer to employ means for automatically controlling the excitation of the generator so that any slight increase in welding current automatically decreases the generator excitation to prevent further increase in the welding current and to restore the welding current to its initial normal value. This result is preferably attained by the electronic control hereinafter described.

My improved welding apparatus may comprise electronic control responsive to the welding current for automatically changing the excitation of the generator which in turn controls the amount of current supplied by the generator. This electronic control may be of such a nature as to confine the fluctuations of welding current within very narrow limits throughout the normal range of welding voltage, so that for all practical purposes it may be stated that the welding current is maintained substantially constant throughout this range.

The action of the electronic control mentioned above as serving the purpose of maintaining the welding current substantially constant throughout the normal range of welding voltage, may be modified to impart to the system a different current-voltage characteristic for voltages above or below the normal range of welding voltage. Thus I may employ additional electronic means for augmenting the normal action of the constant current regulating control, whereby any increase in welding voltage above the normal range results in a curbing of the supply of excitation to the welding generator to such an extent that the welding current decreases in value. This auxiliary electronic control may be responsive to the welding voltage, specifically to changes in welding voltage between values above the normal range of welding voltage. In like manner electronic control responsive to welding voltages below the normal range may be employed for the purpose of supplying to the generator field windings more excitation current than would otherwise be supplied, to thereby insure an increase in welding current as the welding voltage decreases below the normal welding range. By such means the desired drooping characteristic of the welding generator may be obtained throughout the voltage changes above and below the normal welding range, in a system which nevertheless insures substantially constant current throughout the entire normal range of the welding voltage. Such results may be obtained by electronic control which directly increases or decreases the normal current responsive grid control for thyratron rectifier tubes supplying excitation to the generator field, or the desired control at voltage values above and below the normal range of welding voltages may be obtained by shifting the phase of the welding current responsive electronic control for the rectifier.

Figure 2:
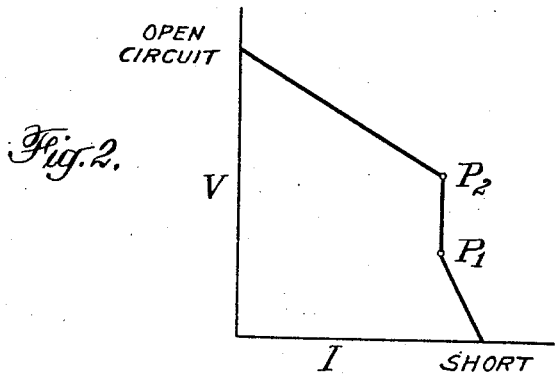

In Fig. 1 of the accompanying drawings I have shown in diagrammatic form an illustrative embodiment of my improved welding apparatus and in Fig. 2 I have illustrated a typical voltage-current characteristic curve for apparatus embodying my invention.

Referring to the embodiment of my invention illustrated in Fig. 1, G represents an ordinary welding generator having a field winding F for supplying excitation which determines the amount of current supplied by the generator. A welding circuit connects the generator G with a welding electrode 1 and the work 2. A shunt resistance R is connected across the welding circuit and a series resistance $R_1$ is also included in the welding circuit, these resistances R and $R_1$ being used for control purposes as hereinafter described.

As explained above, one object of this invention is to provide automatic control for the welding circuit whereby the welding current is maintained substantially constant throughout the normal range of welding voltage. The arc voltage or welding voltage varies during normal operation, the variations being due primarily to slight changes in arc length as the welding operator tries to maintain the arc length uniform. In the system illustrated in Fig. 1 of the drawings the welding current is automatically maintained substantially constant by the action of thyratron rectifier tubes RT and $RT_2$ and welding current responsive control for the rectifier comprising regulating apparatus connected across the series resistance $R_1$. The rectifier supplies current to the welding generator field winding F through a transformer having a primary winding connected to a source of alternating current designated A. C. and a secondary winding $T_1$. The rectifier tubes RT and $RT_2$ are three element tubes having plates connected to the generator field winding F, grids connected to the resistor $T_2$, and a filaments connected to the transformer secondary $T_1$. A portion of the grid control element $T_2$ is connected to a resistance $R_3$ which is in turn connected in a control circuit including a battery or other source of potential, a D. C. amplifier and a resistance $R_2$ connected across the series resistance $R_1$ in the welding circuit so that the amplifier amplifies the difference between the voltage drop across the series resistance $R_1$ and the voltage drop across the resistance $R_2$. The resistance $R_2$ is also connected in a local circuit including a source of potential and a variable resistance RH which may be adjusted to control the voltage drop across the resistance $R_2$.

The operation of that portion of the system of Fig. 1 described above is as follows: whenever there is an increase in the welding current flowing in the welding circuit from the generator G to the arc between the electrode 1 and the work 2, the voltage drop across the series resistance $R_1$ increases accordingly. The resistance $R_1$ is thus an element sensitive to changes in the welding current. The voltage drop across the resistance $R_2$ however remains constant at a value determined by the setting or adjustment of the variable resistance RH. As the voltage drop across $R_1$ increases with the increase in welding current there is an increase in the potential difference between the $R_1$ voltage drop and the $R_2$ voltage drop and this difference is amplified by the D. C. amplifier and the potential drop across resistance $R_3$ is increased accordingly. This has the effect of increasing the negative grid bias of the rectifier tubes RT and $RT_2$ to delay the firing of the rectifier tubes. The average amount of current flowing through the rectifier tubes is thus decreased and the corresponding decrease in the excitation of the welding generator reduces the welding current supplied to the welding circuit by the generator. In this manner the system automatically corrects any tendency of the welding current to exceed the desired value, for any increase in welding current is immediately accompanied by a reduction in excitation current supplied to the generator field winding by the variable source of excitation current. This apparatus is preferably adjusted so that throughout the normal working range of welding voltage the welding current is automatically controlled within such narrow limits that it may be said to be maintained substantially constant throughout this range. This condition is illustrated in Fig 2 where the welding current I is shown as constant for changes of welding voltage V between points $P_1$ and $P_2$. This normal working range of the welding voltage may be from approximately 15 volts to 45 volts.

While it is desirable to have the welding current remain substantially constant throughout the normal range of welding voltage from approximately 15 volts to 45 volts as explained above, it is also desirable to have the welding current decrease as the welding voltage increases beyond this range, with an open circuit voltage limited to approximately 80 volts for purposes of safety. On the other hand, as the short circuit condition is approached, it is desirable to have the welding current increase as the welding voltage decreases below the normal welding range, with a short circuit current in the neighborhood of one hundred and fifty per cent (150%) to two hundred per cent (200%) of the normal welding current. Such conditions are illustrated in Fig. 2 which shows the desired drooping characteristic for ranges above and below the normal range of welding voltage.

The desired drooping characteristic for welding voltages above the normal working range can be obtained in the system described above by using a triode tube $T_4$ responsive to voltage changes across a portion of a shunt resistance R connected in parallel with the electrode 1 and the work 2, the plate circuit of the tube $T_4$ controlling the potential across resistance $R_5$ in series with the control resistance $R_3$. In general, the arrangement is such that for voltages above $P_2$ in Fig. 2 the tube $T_4$ is active to curb the supply of excitation current to the generator field winding F. The circuit arrangement is such that as the open circuit condition is approached the voltage drop across resistance $R_5$ modifies the control action of the voltage drop across resistance $R_3$ so as to retard the firing of the rectifier tubes $RT$ and $RT_2$, to a greater extent than would normally occur due to the action of the D. C. amplifier connected to resistances $R_1$ and $R_2$.

In like manner a tube $T_3$, connected across a portion of the shunt resistance R, may so modify the action of the regulator that increased excitation is supplied to the welding generator whenever the welding circuit voltage decreases below the value shown at $P_1$ in Fig. 2. Thus the plate circuit of the tube $T_3$ in Fig. 1 is connected across a control resistance $R_4$ in series with the resistance $R_3$, and the tube $T_3$ is adapted to fire only at voltages below the value $P_1$ as illustrated in Fig. 2. Thus the voltage drop across resistance $R_4$, determined by the action of the tube $T_3$, accelerates the firing of the rectifier tubes $RT_1$ and $RT_2$ to thereby supply more excitation to the generator field winding than would otherwise be supplied at voltages ranging between the short circuit condition and the value $P_1$ indicating the lower limit of the working range of welding voltage.

The circuits for the tubes $T_3$ and $T_4$ include grid batteries and the combined battery voltage and potential drop across a portion of the shunt resistance R serves to control the firing of the tubes $T_3$ and $T_4$ whereby plate current flows in the circuit of the tube $T_4$ whenever the welding voltage exceeds the value $P_2$ and plate current flows in the circuit of tube $T_3$ whenever the welding voltage is below the value $P_1$, the plate currents of these tubes being commensurate with the magnitude of the change in the potential drop across the shunt resistance R, whereby the excitation of the generator is controlled to provide the desired drooping characteristic at voltages above and below $P_2$ and $P_1$ respectively, as illustrated in Fig. 2. Between the values $P_1$ and $P_2$ the welding current may be said to remain substantially constant because any tendency of this current to increase is immediately counteracted by a corresponding reduction in the excitation current supplied to the field winding F of the generator G. In other words, within this normal welding range, the excitation current varies in inverse ratio to the welding current.

It will be understood that the characteristic curve of Fig. 2 represents the voltage and current conditions for one setting or adjustment of the regulator, and that by manually adjusting the variable resistance RH the regulator setting can be changed to produce other characteristic voltage-current curves each similar to the curve illustrated in Fig. 2 but displaced therefrom. Furthermore, the manually adjustable resistance RH may be used for the purpose of gradually reducing the welding current at the end of a weld to thereby avoid the formation of a crater.

According to my improved process and apparatus it is entirely feasible to provide a voltage-current welding characteristic such that the welding current remains constant throughout the normal range of welding voltage, and the desired drooping characteristic is preserved at voltage values above and below the welding range. This system provides complete automatic control of transient conditions and both the open circuit voltage and the short circuit current values may be controlled independently of the current control throughout the normal range of welding voltage. Complete elimination of current droop from cold to hot conditions may be attained and the system provides complete stepless control in one range from minimum to maximum by means of a single small rheostat, such as that illustrated at RH in Fig. 1. This rheostat control lends itself readily to remote control of the system, whereby the adjustment of the regulator may be changed at will, and the formation of craters may be avoided without providing any auxiliary equipment for accomplishing this result.

It is to be understood that my invention is not limited to the particular process and apparatus described above in detail but includes such modifications thereof as fall within the scope of the appended claims.

I claim:

1. Electric welding apparatus comprising the combination of a welding circuit, a welding generator for supplying current to said welding circuit and having a field winding for supplying excitation to control the amount of current supplied to said welding circuit, means for supplying excitation current to said field winding, and control means connected to the welding circuit and to said excitation supplying means, said control means being responsive to the current in the welding circuit for causing said excitation current to change in inverse ratio to the welding current throughout the normal operating range of welding voltage, whereby the welding current is maintained substantially constant throughout said range of welding voltage.

2. Electric welding apparatus comprising the combination of a welding circuit, a welding generator for supplying current to said welding circuit, control means connected to the welding circuit and responsive to the current in the welding circuit for controlling the excitation of the welding generator to maintain the supply of current to said welding circuit substantially constant throughout the normal operating range of welding voltage, and means connected to the welding circuit and to said control means and responsive to welding voltages above said range for causing the welding current to decrease with increase in welding voltage above said range.

3. Electric welding apparatus comprising the combination of a welding circuit, a welding generator for supplying current to said welding circuit, control means connected to the welding circuit and responsive to the current in the welding circuit for controlling the excitation of the welding generator to maintain the supply of current to said welding circuit substantially constant throughout the normal operating range of welding voltage, and means connected to the welding circuit and to said control means and responsive to welding voltages below said range for causing the welding current to increase with decrease in welding voltage below said range.

4. Electric welding apparatus comprising the combination of a welding circuit, a welding generator for supplying current to said welding circuit and having a field winding for supplying excitation to control the amount of current supplied to said welding circuit, means for supplying excitation current to said field winding, control means connected to the welding circuit and to said excitation supplying means and responsive to the current in the welding circuit for causing said excitation current to change in inverse ratio to the welding current throughout the normal operating range of welding voltage, whereby the welding current is maintained substantially constant throughout said range of welding voltage, and means connected to said welding circuit and to said control means and responsive to welding voltages above said range for limiting the excitation current whereby the welding current decreases with increase in welding voltage above said range.

5. Electric welding apparatus comprising the combination of a welding circuit, a welding generator for supplying current to said welding circuit and having a field winding for supplying excitation to control the amount of current supplied to said welding circuit, means for supplying excitation current to said field winding, control means connected to the welding circuit and to said excitation supplying means and responsive to the current in the welding circuit for causing said excitation current to change in inverse ratio to the welding current throughout the normal operating range of welding voltage, whereby the welding current is maintained substantially constant throughout said range of welding voltage, and means connected to said welding circuit and to said control means and responsive to welding voltages below said range for causing sufficient excitation current to be supplied to said field winding to produce an increase in the welding current with a decrease in welding voltage below said range.

6. Electric welding apparatus comprising the combination of a welding circuit, a welding generator for supplying current to said welding circuit, control means connected to the welding circuit and responsive to the current in the welding circuit for controlling the excitation of the welding generator to maintain the supply of current to said welding circuit substantially constant throughout the normal operating range of welding voltage, means connected to said welding circuit and to said control means and responsive to welding voltages above said range for causing the welding current to decrease with increase in welding voltage above said range, and means connected to said welding circuit and to said control means and responsive to welding voltages below said range for causing the welding current to increase with decrease in welding voltage below said range.

7. Electric welding apparatus comprising the combination of a welding circuit, a welding generator for supplying current to said welding circuit and having a field winding for supplying excitation to control the amount of current supplied to said welding circuit, means for supplying excitation current to said field winding, control means connected to the welding circuit and to said excitation supplying means and responsive to the current in the welding circuit for causing said excitation current to change in inverse ratio to the welding current throughout the normal operating range of welding voltage, whereby the welding current is maintained substantially constant throughout said range, means connected to said welding circuit and to said control means and responsive to welding voltages above said range for limiting the excitation current, whereby the welding current decreases with increase in welding voltage above said range, and means connected to said welding circuit and to said control means and responsive to welding voltages below said range for causing sufficient excitation current to be supplied to said field winding to produce an increase in the welding current as the welding voltage decreases below said range.

8. Electric welding apparatus comprising the combination of a welding circuit, a welding generator for supplying current to said welding circuit and having a field winding for supplying excitation to control the amount of current supplied to said welding circuit, means for supplying excitation current to said field winding, welding current regulating means connected to said welding circuit and to said excitation supplying means and responsive to any increase in the current in the welding circuit throughout the normal range of welding voltage, to decrease the excitation current whereby the welding current is maintained substantially constant throughout said range, and means connected to said welding circuit and to said welding current regulating means and responsive to any increase in the welding voltage above said range, for causing said regulating means to decrease the excitation current to such an extent that the welding current decreases with increase in welding voltage above said range.

9. Electric welding apparatus comprising the combination of a welding circuit, a welding generator for supplying current to said welding circuit and having a field winding for supplying excitation to control the amount of current supplied to said welding circuit, means for supplying excitation current to said field winding, welding current regulating means connected to said welding circuit and to said excitation supplying means and responsive to any increase in the current in the welding circuit throughout the normal range of welding voltage, to decrease the excitation current, whereby the welding current is maintained substantially constant throughout said range, and means connected to said welding circuit and to said welding current regulating means and responsive to a decrease in welding voltage below said range for curbing the action of said regulating means, whereby the welding current increases with decrease in welding voltage below said range.

10. Electric welding apparatus comprising the combination of a welding circuit, a welding generator for supplying current to said welding circuit and having a field winding for supplying excitation to control the amount of current supplied to said welding circuit, means for supplying excitation current to said field winding, welding current regulating means connected to said welding circuit and to said excitation supplying means and responsive to any increase in the current in the welding circuit, throughout the normal range of welding voltage, to decrease the excitation current, whereby the welding current is maintained substantially constant throughout said range, means connected to said welding circuit and to said regulating means and responsive to welding voltage increases above said range for causing said regulating means to decrease the excitation current to such an extent that the welding current decreases with increase in welding voltage above said range, and means connected to said welding circuit and to said regulating means and responsive to a decrease in welding voltage below said range for curbing the action of said regulating means, whereby the welding current increases with decrease in welding voltage below said range.

11. Electric welding apparatus comprising the combination of a welding circuit, a welding generator for supplying current to said welding circuit and having a field winding for supplying excitation to control the amount of current supplied to said welding circuit, a source of alternating current and a thyratron rectifier for supplying excitation current to said field winding, and means responsive to the current in the welding circuit for controlling the amount of excitation current supplied by said rectifier, whereby the welding current is maintained substantially constant throughout the normal range of welding voltage.

12. Electric welding apparatus comprising the combination of a welding circuit, a welding generator for supplying current to said welding circuit and having a field winding for supplying excitation to control the amount of current supplied to said welding circuit, a source of alternating current and a thyratron rectifier for supplying excitation current to said field winding, means responsive to the current in the welding circuit for controlling the amount of excitation current supplied by said rectifier, whereby the welding current is maintained substantially constant throughout the normal range of welding voltage, and means responsive to welding voltages above said range for increasing the fire point grid voltage of said rectifier, whereby the welding current decreases with increase in welding voltage above said range.

13. Electric welding apparatus comprising the combination of a welding circuit, a welding generator for supplying current to said welding circuit and having a field winding for supplying excitation to control the amount of current supplied to said welding circuit, a source of alternating current and a thyratron rectifier for supplying excitation current to said field winding, means responsive to the current in the welding circuit for controlling the amount of excitation current supplied by said rectifier, whereby the welding current is maintained substantially constant throughout the normal range of welding voltage, means responsive to welding voltages above said range for increasing the fire point grid voltage of said rectifier, whereby the welding current decreases with increase in welding voltage above said range, and means responsive to welding voltage below said range for decreasing the fire point grid voltage of said rectifier, whereby the welding current increases with decrease in welding voltage below said range.

14. Electric welding apparatus comprising the combination of a welding circuit, a welding generator for supplying current to said welding circuit and having a field winding for supplying excitation to control the amount of current supplied to said welding circuit, a source of alternating current and a thyratron rectifier for supplying excitation current to said field winding, means responsive to the current in the welding circuit for controlling the amount of excitation current supplied by said rectifier, whereby the welding current is maintained substantially constant throughout the normal range of welding voltage, and means responsive to welding voltages below said range for decreasing the fire point grid voltage of said rectifier, whereby the welding current increases with decrease in welding voltage below said range.

15. Electric welding apparatus comprising the combination of a welding circuit, a welding generator for supplying current to said welding circuit and having a field winding for supplying excitation to control the amount of current supplied to said welding circuit, a source of alternating current and a thyratron rectifier for supplying excitation current to said field winding, adjustable means responsive to the current in the welding circuit for controlling the amount of excitation current supplied by said rectifier, and manually operable means for changing the adjustment of said current responsive means.

16. Electric welding apparatus comprising the combination of a welding circuit, a welding generator for supplying current to said welding circuit and having a field winding for supplying excitation to control the amount of current supplied to said welding circuit, a source of alternating current and a thyratron rectifier for supplying excitation current to said field winding, adjustable means responsive to the welding voltage and to the welding current for controlling the amount of excitation current supplied by said rectifier, and manually operable means for changing the adjustment of said adjustable means.

17. Electric welding apparatus comprising the combination of a welding circuit, a welding generator for supplying current to said welding circuit, said generator having a field winding supplying excitation to control the amount of current supplied to said welding circuit, a variable source of current for said field winding, a welding current sensitive element in the welding circuit, and control means connected to said element and to said source of current to change the field excitation current in response to changes in the welding current throughout the normal operating range of welding voltage to maintain the welding current substantially constant throughout said range of welding voltage.

18. Electric welding apparatus comprising the combination of a welding circuit, a generator for supplying current to said welding circuit, said generator having a field winding supplying excitation to control the amount of current supplied to said welding circuit, a variable source of current for said field winding, a welding current sensitive element in the welding circuit, control means connected to said current sensitive element and to said source of current to change the field excitation current in response to changes in the welding current throughout the normal operating range of welding voltage to maintain the welding current substantially constant throughout said range of welding voltage, a welding voltage sensitive element connected in the welding circuit and means connected to said voltage sensitive element and to said source of current to change the field excitation current in response to changes in the welding voltage above said range to cause the welding current to decrease with increase in welding voltage above said range.

19. Electric welding apparatus comprising the combination of a welding circuit, a welding generator for supplying current to said welding circuit, said generator having a field winding supply excitation to control the amount of current supplied to said welding circuit, a variable source of current for said field winding, a welding current sensitive element in the welding circuit, control means connected to said current sensitive element and to said source of current to change the field excitation current in response to changes in the welding current throughout the normal operating range of welding voltage to maintain the welding current substantially constant throughout said range of welding voltage, a voltage sensitive element connected to said welding circuit and means connected to said voltage sensitive element and to said source of current to change the field excitation current in response to changes in the welding voltage below said range for causing the welding current to increase with decrease in welding voltage below said range.

JOSEPH M. TYRNER.

REFERENCES CITED

The following references are of record in the file of this patent:

UNITED STATES PATENTS

| Number | Name | Date |
|---|---|---|
| 1,645,149 | Mann | Oct. 11, 1927 |
| 1,667,244 | Churchward | Apr. 24, 1928 |
| 1,872,681 | Crago | Aug. 23, 1932 |
| 1,904,465 | Horowitz | Apr. 18, 1933 |
| 2,102,761 | Strobel | Dec. 21, 1937 |
| 2,351,083 | Tyrner | June 13, 1944 |